Figure 1:
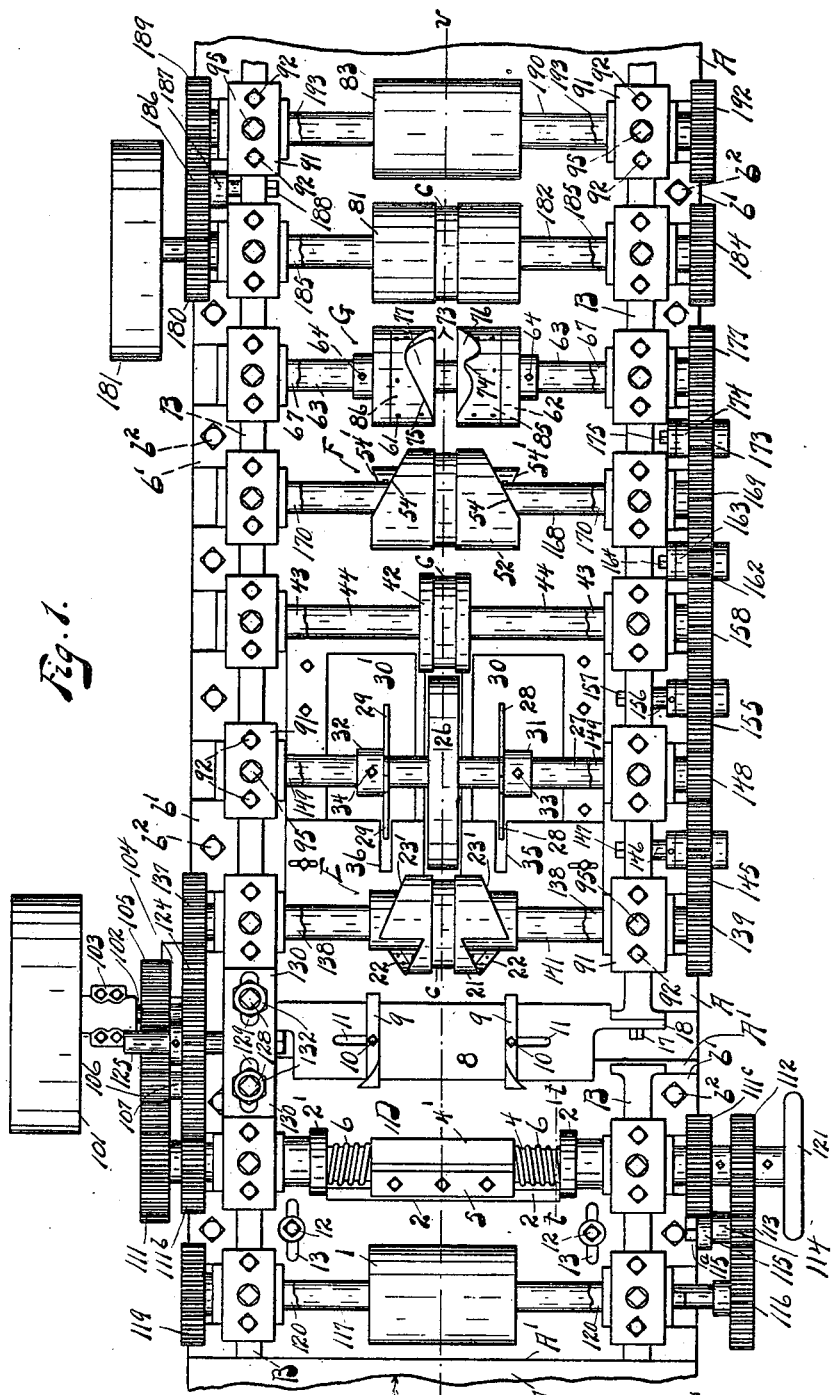

No. 666,854. Patented Jan. 29, 1901.
G. A. MUENZENMAIER.
BOTTLE WRAPPER MACHINE.
(Application filed Oct. 15, 1900.)
(No Model.) 5 Sheets—Sheet 1.

Witnesses:
Inventor:
George A. Muenzenmaier,

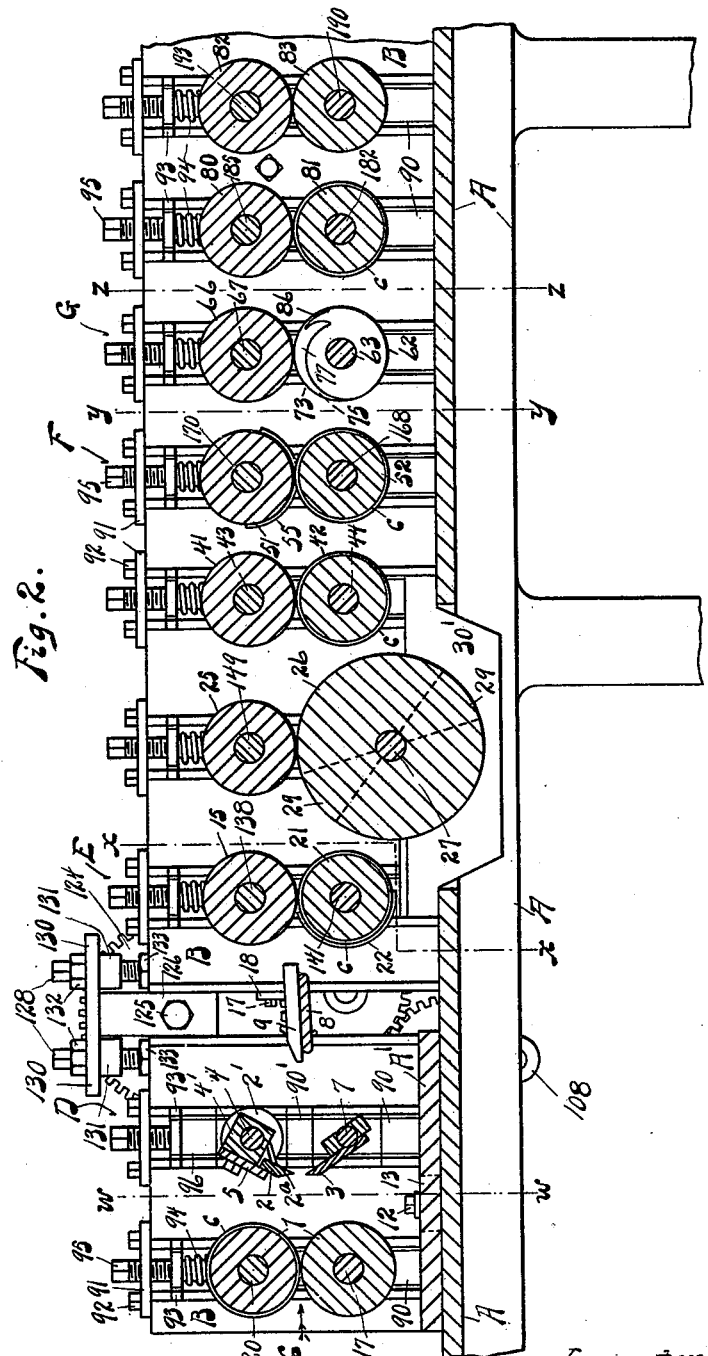

No. 666,854. Patented Jan. 29, 1901.
G. A. MUENZENMAIER.
BOTTLE WRAPPER MACHINE.
(Application filed Oct. 15, 1900.)
(No Model.) 5 Sheets—Sheet 3.
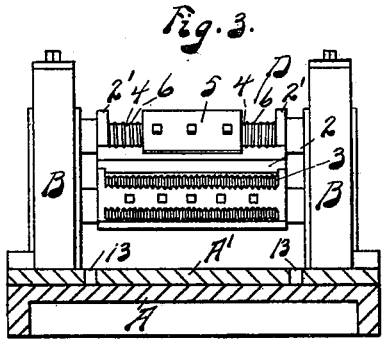
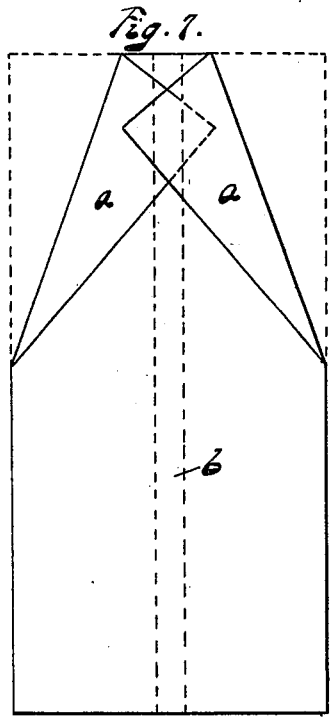
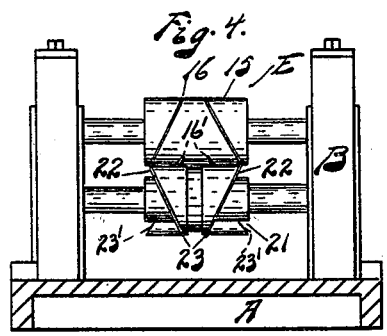
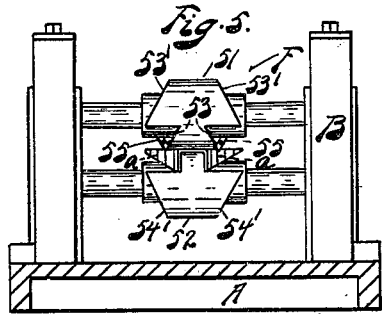
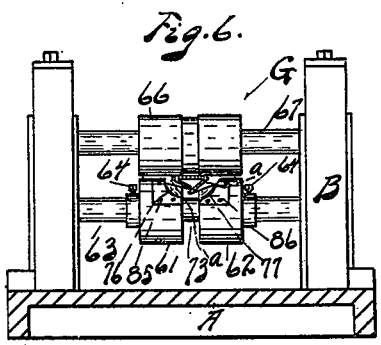

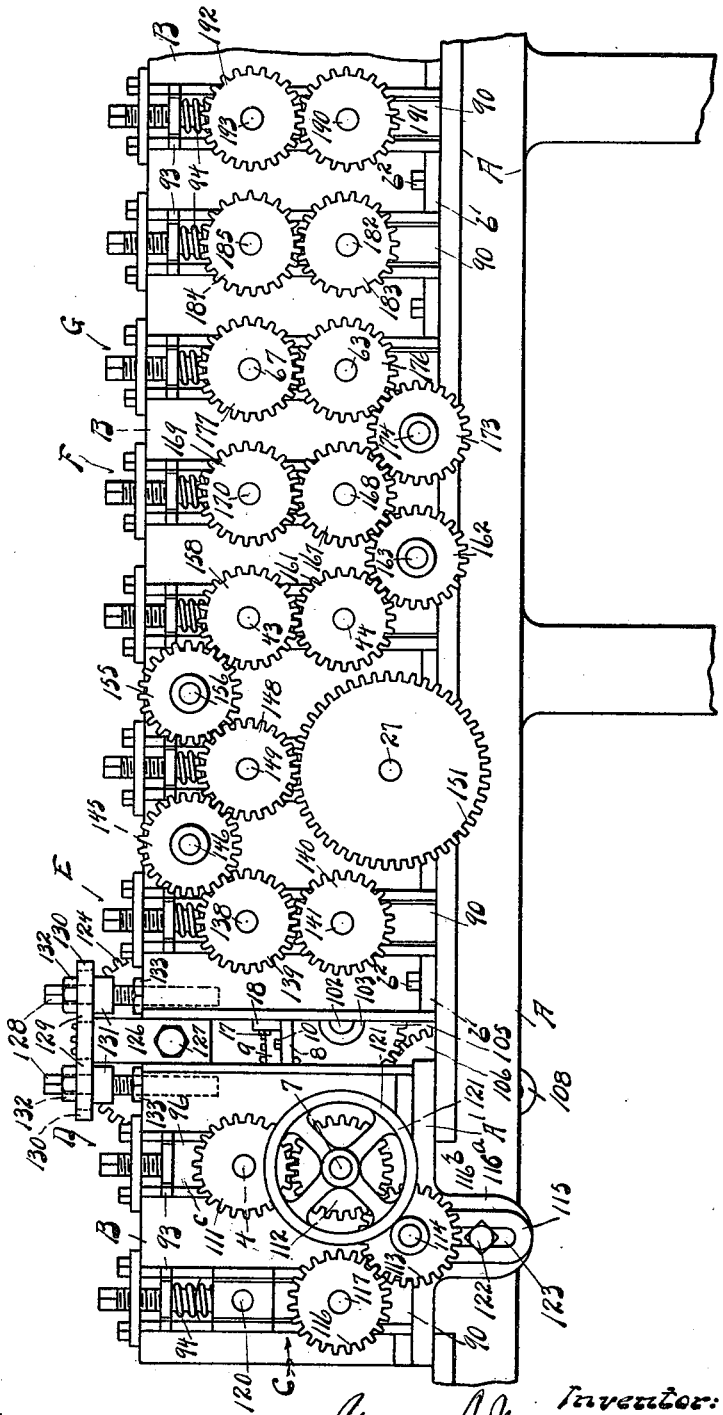

No. 666,854. Patented Jan. 29, 1901.
G. A. MUENZENMAIER.
BOTTLE WRAPPER MACHINE.
(Application filed Oct. 15, 1900.)
(No Model.) 5 Sheets—Sheet 5.
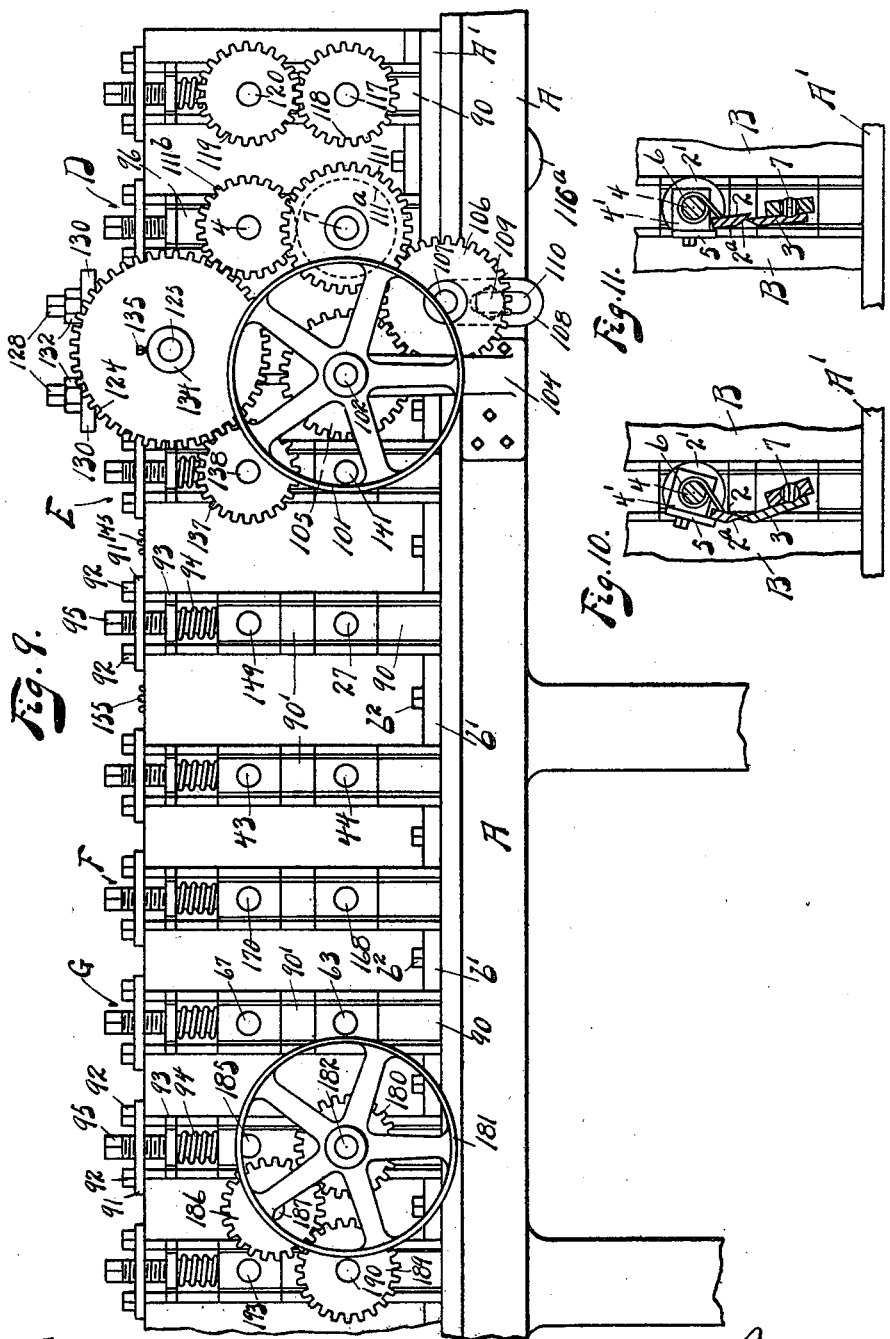

UNITED STATES PATENT OFFICE.

GEORGE A. MUENZENMAIER, OF CINCINNATI, OHIO.

BOTTLE-WRAPPER MACHINE.

SPECIFICATION forming part of Letters Patent No. 666,854, dated January 29, 1901.

Application filed October 15, 1900. Serial No. 33,122. (No model.)

*To all whom it may concern:*

Be it known that I, GEORGE A. MUENZENMAIER, a citizen of the United States, residing at Cincinnati, in the county of Hamilton and State of Ohio, have invented certain new and useful Improvements in Bottle-Wrapper Machines, of which the following is a specification.

My invention relates to bottle-wrapper machines for making bottle-wrappers having diagonal flaps turned over at the neck end of the wrapper.

It consists in providing a machine of this character in which the tubing forming the bottle-wrapper is acted upon by rotating parts for folding over the diagonal flaps at the neck end of the wrapper, thereby enabling great speed in operation to be attained, and, further, in the peculiar form of rotating folding devices herein described and claimed.

It consists, further, in the parts and in the construction, arrangement, and combinations of parts hereinafter more fully described and claimed.

In the drawings, Figure 1 is a plan view of so much of my improved bottle-wrapper machine as is necessary to illustrate my invention, showing, however, part of the upper feeding and other agencies broken away to expose the lower agencies. Fig. 2 is a central longitudinal section of so much of the machine as is necessary to illustrate my invention, taken on a line corresponding to the line $v\ v$ of Fig. 1. Fig. 3 is a transverse section taken on the line $w\ w$ of Fig. 2, showing the severing devices in side elevation looking from the feed-in end of the machine, with the means for driving the same omitted. Fig. 4 is a similar view taken on line $x\ x$ of Fig. 2, showing the creasing devices in side elevation looking from the feed-out end of the machine, with the means for driving the same omitted. Fig. 5 is a similar view taken on line $y\ y$ of Fig. 2, showing the bending devices in side elevation looking from the feed-out end of the machine, with the means for driving the same omitted. Fig. 6 is a similar view taken on line $z\ z$ of Fig. 2, showing the folding devices in side elevation looking from the feed-out end of the machine, with the means for driving the same omitted. Fig. 7 indicates a plan view of a finished wrapper. Fig. 8 is a right side elevation of so much of my improved bottle-wrapper machine as is necessary to illustrate my invention, and Fig. 9 is a left side elevation of the same. Fig. 10 is a detail of the cutting device in section, taken on the line $t\ t$ of Fig. 1; and Fig. 11 is a similar view showing the cutting-knives in a different position for better illustration of their operation.

A represents the frame of my machine, and B the standards to or between which the bearings for the various rotatable devices may be secured. The standards may have feet $b'$, through which they are secured to the frame by bolts $b^2$. The direction of the feed is indicated by the arrow C.

It is contemplated that before the paper which shall form the finished wrapper shall have reached the severing devices of the machine it will have been formed into a continuous tubing in any ordinary or well-known manner, the tubing being in flattened condition when it reaches the feed-in rolls 1 1. The mechanism for forming the tube is well known in the art, and it is therefore considered surplusage to either show or describe the same. The tubing is cut off in proper lengths for forming finished wrappers by means of severing device D, which may be described as follows:

The end of the continuous tubing takes between the two knives 2 3. The knife 2 is pivoted at 2' about its shaft 4. A block 4' is secured to shaft 4, to which latter a stop-plate 5 is rigidly secured, against which the knife is normally pressed by means of springs 6, one end of which latter is secured to the shaft, the other taking against the knife. The knife 3 is rigidly secured to its shaft 7. The knives are rotated toward each other in the direction of the feed. The knife 3 is preferably provided with a serrated cutting edge, and when the cutting edges of the knives meet to sever the tube-blank for forming the wrapper the knife 2 takes to the inside of the circle of cut of knife 3, which latter knife, being rigidly secured to its shaft, in following out its predetermining circle of rotation climbs slightly upon the beveled edge $2^a$ of the knife 2, the bevel edge normally taking into the circle of cut of knife 3; but the knife 2 being pivoted upon its shaft the knife 3 in taking against the bevel edge 2ª slightly turns the knife 2 upon it shaft against the tension of the spring 6 to assist in the severing operation. When the knife 2 is turned upon its shaft, it is moved slightly away from the stop-plate 5, as shown more clearly in Fig. 11, the spring 6 returning the knife 2 against the stop-plate after the blank is severed, and the knife 2 is relieved from pressure upon its beveled edge by the knife 3. The severed portion of the tube, to which I shall refer as the "wrapper-blank," is supported by a bridge 8, having side guides 9, which may be adjustably secured thereon by means of T-bolt and nut 10 in the slot 11 on the bridge guiding the wrapper-blank in proper transverse position. The bridge may be adjustably secured to a standard by bolts 17, taking through slots in lugs 18 thereon.

In practice bottles are of different sizes and shapes, and it is desirable to have wrappers of sizes and shapes to correspond to those of the bottles. For instance, in the bottling of beer pint and quart bottles are those in most general use, the wrapper for quart bottles being usually twelve inches long and that for pint bottles ten inches long, with a corresponding difference in length and angle of the bent portion for the neck of the wrappers. In the drawings I have shown my machine as especially fitted up for making the size wrappers ordinarily used for pint bottles, with devices also shown for use in making wrappers for quart bottles, although it is obvious that my device may be used for making wrappers of any desired size and length or diagonal angle of flaps.

In my improved machine the creasing, forming, and folding devices, to be hereinafter described, are preferably operated at a common rate of peripheral speed irrespective of the size of wrapper to be produced, the space between the severing and creasing devices being sufficiently long to accommodate the longest wrapper to be made. The speed of the feeding-in rolls is, however, regulated, as hereinafter described, to have admitted only sufficient of the tubing beyond the severing agencies to form the proper length of wrapper when the severing agencies act to sever the wrapper-blank. When the severing device acts, the forward end of the wrapper-blank will have advanced sufficiently to be engaged by creasing or scoring devices E, or if a wrapper is being made of less length than the space between the severing-point of the severing device and the creasing devices the knife 2 will advance the wrapper-blank into contact with the creasing devices, the forward movement of the severing device being very rapid, so that the wrapper-blank will be thrust into proper contact with the creasers. The severing device and, if desired, the infeeding-rolls may be mounted on a supplemental frame A', adjustably secured to the frame by means of bolts 12, taking through slots 13 in the supplemental frame and into the frame proper, the severing device being thus adjusted to and from the creasing devices to accommodate for different lengths of wrappers. The creasing devices are adapted to provide the neck end of the wrapper-blank with diagonal creases or scores to indicate the position of the flaps a at the neck end of the bottle-wrapper and to aid in the ready bending of the flaps. They consist, preferably, of an upper roll 15, provided with diagonal grooves 16. A lower roll 21 is provided, having diagonal blades 22 secured thereto in a suitable manner, as against diagonal faces 23, so as to meet the grooves 16 in the other roll, thereby pressing the wrapper-blank between the blades and grooves and providing it with diagonal creases or scores to indicate the lines along which the same is afterward folded to form the flaps. The blank is next advanced between a pair of feed-rolls 25 26, the latter of which is mounted on a shaft 27. The shaft 27 may also carry wings 28 29, adapted to dip into troughs 30 30', which may contain paste or other adhesive substance, which latter by means of the wings is transferred to the outer edges of the flaps at the neck end of the bottle-wrapper blank, so that when the flaps are turned over they may adhere to the body of the blank. The wings may extend from hubs 31 32, adjustably secured to shaft 27 by means of set-bolts 33 34. Scrapers 35 36 may be provided for taking the surplus glue from the wings and be adjustable into position corresponding to that of the wings in any suitable manner. The wrapper-blank is next advanced by means of a pair of feed-rolls 41 42, the lower feed-roll 42 being narrow, so as to avoid the pasted portions of the flaps. These feed-rolls are mounted on shafts 43 44. The wrapper-blank is next advanced to bending device F, arranged to partially bend the flaps on the wrapper-blank and consisting, preferably, of rolls 51 52. The roll 51 has diagonal ends or shoulders 53 extending from each side near its middle diagonally along the periphery of the roll outwardly toward its end. The roll 52 is provided with similar diagonal ends or shoulders 54, the longitudinal distance between the latter shoulders being preferably slightly less than the distance between the shoulders 53. Blades 55 are attached to the shoulder 53 in suitable manner, extending sufficiently beyond the periphery of the roll, so that when the neck end of the wrapper-blank is introduced between the rolls and the blades 55 and the opposing shoulders 54 the flaps may be bent downwardly, as more clearly shown in Fig. 5, to form the flaps, preferably along the line of the creases made by the creasing devices hereinbefore explained. The flaps are partly bent over by the bending devices and may next be advanced to folding device G, consisting, preferably, of a pair of rolls 61 62, mounted on a shaft 63, to which they may be adjustably secured by set-bolts 64. The wrapper-blank is passed between the rolls and an opposing roll 66, mounted on a shaft 67. The rolls 61 62 have their peripheries provided with peculiarly-shaped depressions or cavities, into which the flaps formed by the bending device are adapted to take and be guided by the walls or shoulders of the depressions or cavities, so as to fold one flap under the other and fold both flaps toward the body of the wrapper-blank while the parts are rotating. The operation is more clearly shown in Fig. 6. It is obvious that the folding-rolls 61 62 may be made integral with each other or the depressions or cavities formed in a single rotating device.

The portion of the rotary device for folding over the flaps may be described as a rotatable part having a depression, recess, or cavity 73 extending to both sides of the middle of the width of the wrapper-blank position, into which the partially-bent flaps take, with the recess abbreviated at its rear on one side of the said middle more than on the other and with the rear ends of the recesses inclined toward the middle, forming engaging faces 74 75, and the rotating part curved about its axis on substantially the arc of a circle. The recess at each side is also preferably sloped from the peripheral line of the rotatable part inwardly toward its axis, forming sloping sides 76 77, aiding in turning under the flaps. In operation the outer ends of the flaps will be first received into the forward end of the recess. As the wrapper-blank is advanced by the feeding operation of the machine and the folding device is correspondingly rotated the shoulder 74 will first lift the flap on its side of the wrapper-blank toward the body of the wrapper-blank, and the shoulder 75 will then lift the flap on its side against the other flap, and as the wrapper-blank is still farther advanced the peripheral face of the rotating part will cause the flaps to take against the body of the wrapper-blank. As the wrapper is still further advanced it will be seized by a pair of feeding-out rolls 80 81, which will pass it on to other feeding-out rolls 82 83, of which a series of sufficient number may be provided to properly press the wrapper into finished state. I prefer to form the recess 73 and engaging faces 74 75 in plates 85 86, removably secured to the rolls 61 62, so that the plates may be removed and others having differently-formed recess and engaging faces for folding over differently-sized flaps substituted. The rolls 61 62 may also be adjustable to and from each other on the shaft 63.

The various rotating devices may be provided with peripheral grooves $c$ to allow for the additional thickness or seam at the middle of the tubing, as at $b$, caused by the overlapping and pasting of the edges of the material for forming the tubing.

The operation of the respective devices is so timed that the cutting-off apparatus will cut the tubing to blanks of proper length for forming the wrapper, the creasing or scoring devices will diagonally score the end of the blank so cut off, the gluing devices provide the flaps so formed with a sufficient strip of glue to cause the flaps when bent over to adhere with relation to the body of the blank, the narrow feed-roller beyond the gluing devices passing the piece to the bending devices, which are also rotated and timed so that the mutilated edges of the latter may register with the scoring of the blank left by the creasing devices, the blank being then passed on to the rotary folding devices, which are rotated at just such speed and time as to have the flaps take into the depressions in the folding-roller. The rotary devices rotate with the infeeding-faces of each pair toward each other—that is, they rotate with the feed. The various devices and rolls are provided with suitable gearing for accomplishing these purposes, their respective shafts being preferably elongated beyond the side of the frame to receive the gears.

The bearings for the various rotatable devices take between the standards B, the bearings for the lower devices resting on blocks 90, inserted between the standards. Suitable bridge-pieces 91 span the space between adjacent standards, to which they are secured by means of bolts 92. Washers 93 are inserted between the standards above the bearings and under the bridge-pieces, with springs 94 interposed between the washers and the bearings, set-bolts 95 regulating the tension of the springs and position of the washers. In the cutting devices, however, the springs are preferably omitted to insure greater accuracy, the space between the bearings for the upper and lower shaft being filled in with block 90', and a block 96 being inserted in place of the spring. Blocks 90' are also preferably placed between the bearings at each end of each pair of rolls.

I will now describe my preferred means for interconnecting and driving the various devices hereinbefore described, using the terms "right" and "left" as determined by the position of a person standing at the feed-in end of the machine looking in the direction of the feed.

A pulley 101 is secured to a shaft 102, journaled in the frame in suitable bearings 103, one of which is located on a bracket 104, extending from the frame A. The shaft 102 also carries a pinion 105, meshing with a transmitting-gear 106 on a stud 107 on an adjustable bracket 108, secured to the frame by a bolt 109 taking through a slot 110 and into the frame. The gear 106 meshes with a gear 111, secured to the left end of the lower-cutter shaft 7. The upper-cutter shaft 4 is operated through the lower-cutter shaft 7 by means of a gear $111^a$ on the shaft 7 meshing with a gear $111^b$ on the shaft 4 of the upper cutter-head on the left side of the machine, the cutter-shaft 4 also preferably carrying a gear $111^c$ at its right end, meshing with a similar gear below it on the lower-cutter shaft 7, behind the gear 112. The infeeding-rolls are also preferably operated through the lower-cutter shaft 7 by means of a gear 112 on the latter meshing with a transmitting-gear 113, mounted on a stud 114, secured to an adjustable bracket 115 by a bolt 115ª, the gear 113 meshing with a gear 116 on the right end of the shaft 117 of the lower infeeding-roll 1, the other end of the shaft 117 having a gear 118 secured thereto, meshing with a gear 119 on the shaft 120 of the upper infeeding-roll.

As heretofore explained, it may be desirable to give the infeeding-rolls a different circumferential speed from that of the scoring, creasing, and folding devices when different-sized wrappers are being made. To do this, I prefer to exchange the gear 112 for one of different diameter, which is put in its place in order to give the proper speed to the infeeding-wheels, the hand-wheel 121 being first taken off the shaft 7. After the proper-sized gear 112 is put in its place on the shaft 7 the transmitting-gear 113 is set so as to properly mesh between the gear 112 and 116, suitable provision for this adjustment being made by means of the adjustable bracket 115, adjustably secured to an apron 116ª on the supplemental frame by having a securing-bolt 122 take through a slot 123 in the bracket. Thus, for instance, if it is desired to make wrappers for quart bottles, a slightly-larger gear 112 is put in the place of the gear shown to give the infeeding-rolls the proper proportionate increased speed to feed sufficient tubing for a quart-sized blank between the cutters before the latter sever the same. A recess 116ᵇ is provided in the frame A to accommodate the apron 116ª when the supplemental frame A′ is shifted on the frame A.

To transmit motion to the scoring and following devices, I provide a transmitting-gear 124, meshing with gear 111ᵇ. The gear 124 rotates, preferably, on an elongated stud 125, secured to a block 126 by means of a nut 127. The block may be secured with relation to the frame by having bolts 128 take through slots 129 in wings 130 on the block and into the standards B. The wings 130 rest on shoulders 131 on the bolts 128 and are secured firmly by nuts 132 to the bolts, while the latter are locked to the frame by nuts 133. The tops of the bolts are squared to permit their being turned. This construction permits proper adjustment and meshing of the gearing when the supplemental frame A′ is shifted on the frame A. The transmitting-gear 124 transmits its motion to a gear 137 at the left end of the shaft 138 of the upper scorer 15, the other end of the shaft 138 carrying a gear 139, meshing with a gear 140 on the shaft 141 of the lower scorer 21, the gears 139 and 140 being of the same size to transmit uniform motion to the two rolls of the creasing or scoring device.

A transmitting-gear 145 is mounted on a stud 146, secured to a standard by a bolt 147, and transmits motion through the gear 139 to a gear 148 on the shaft 149 of the roll 25. The gear 148 meshes with a gear 151 on the shaft 27 of the gluing device, the gear 151 being a large gear proportioned to give the shaft 27 a half-revolution to each revolution of the shaft 149, because I prefer to provide the shaft 27 with duplicate wings 29 of sufficient length to dip into the paste-troughs, operating alternately on successive wrapper-blanks.

A transmitting-gear 155 is mounted on a stud 156, secured to a standard by means of a bolt 157, and receives motion from the gear 148 and transmits motion to a gear 158 on the shaft 43 of the upper feed-roll 41. Motion is in turn transmitted from the gear 158 to the gear 161 on the shaft 44 of the lower feed-roll 42 and from thence to a transmitting-gear 162, mounted on a stud 163, secured to the frame by means of a bolt 164. The transmitting-gear 162 meshes with a gear 167 on the shaft 168 of the lower bending-roll 52, which gear 167 meshes with a gear 169 on the shaft 170 of the upper bending-roll 51. From the bending device motion is transmitted to the folding device by means of a transmitting-gear 173, mounted on a stud 174, secured to the frame by means of a bolt 175. The transmitting-gear 173 meshes with a gear 176 on the shaft 63 of the lower folding device, while gear 176 meshes with a gear 177 on the shaft 67 of the upper folding device.

Motion may be transmitted to the feed-out rolls from the folding devices by a transmitting-gear similar to the transmitting-gear 173; but I prefer to give the feed-out rolls a separate connection with the source of power, as by means of a pulley 181, mounted on the shaft 182 of the lower feeding-out roll 81, companion gears 183 184, mounted, respectively, on the shaft 182 and on the shaft 185 of the upper feeding-out roll 80, serving to transmit the motion to that upper feeding-out roll. Power is transmitted to the second pair of feeding-out rolls by means of a transmitting-gear 186, mounted on a stud 187, secured to a standard by a bolt 188. The transmitting-gear 186 receives motion from a gear 180 on shaft 182 and transmits motion to a gear 189 at one end of the shaft 190 of the lower feed-out roll 83, the other end of the shaft 190 carrying a gear 191, meshing with a gear 192 on the shaft 193 of the feed-out roll 82.

As heretofore explained, I can, if desired, make different-sized-bottle wrappers upon my improved device. For the purpose, therefore, of making, say, quart-sized-bottle wrappers I preferably provide the creasing and the bending devices with grooves and diagonal faces for wrappers of this size on the respective rolls on the sides thereof opposite the sides on which the grooves and faces in use when pint-sized-bottle wrappers are being made. For instance, in the creasing device I provide the roll 15 with a groove 16′ and the roll 21 with diagonal faces 23′. If it is desired to make a quart-sized-bottle wrapper, the blades 22 are removed from the faces 23 and attached to the faces 23', when the blades instead of registering with the grooves 16 will register with the grooves 16'. In the bending device also I provide the roll 51 with shoulders 53' on the side of the roll opposite to that on which the shoulders 53 are located, and I provide the roll 52 with shoulders 54' on the side of the latter roll opposite to that on which the shoulders 54 are located. If it is desired to make wrappers for quart-sized bottles, the blades 55 are removed from the shoulders 53 and attached to the shoulders 53', when they will register with the opposite shoulders 54' of the lower bending-roll. The rolls 61 and 62 of the folding device are also turned upon their shaft to bring their shoulders to the opposite side of the shaft and may be otherwise adjusted for the new work being done, as hereinbefore explained. The transmitting-gear 124 is now slipped sidewise upon its stud 125 out of mesh with the gears 111$^b$ and 137, and the cutting devices are given a substantial half-revolution by means of the hand-wheel 121, so as to bring the cutting devices into such position that they will perform their cutting operation at the proper point for the new-sized wrapper-blank and will cause the feeding-in end of the new-sized wrapper-blank to make proper connection with the new position of the blades 22 upon the creasing devices E. The transmitting-gear 124 is then slipped back into proper position and secured against sidewise motion by the collar 134, secured by the bolt 135. The wings 28 29 of the gluing devices are then turned and moved sidewise slightly upon their shaft, so as to apply the glue at the proper point of the new size of wrapper-blank, and then secured in position upon the shaft by means of the bolts 33 34. If necessary, the speed of the infeeding-rolls is also regulated in the manner heretofore explained and, if desired, the severing and infeeding devices adjusted with relation to the scoring and following devices by an adjustment of the supplemental frame A' upon the frame A.

I claim—

1. In a bottle-wrapper machine, the combination of a rotary bending device for partially bending over diagonal flaps at the neck end of a wrapper-blank, with a rotary folding device provided with shoulders acting on the diagonally partially bent flaps for folding the same toward the body of the wrapper-blank along the diagonal lines of the bends made by the bending device, substantially as described.

2. A folding device in a bottle-wrapper machine comprising a rotary part for folding over the flaps at the neck end of a bottle-wrapper blank, with a recess therefor extending to both sides of the middle of the width of the wrapper-blank position for receiving the partially-bent flaps, with an engaging face for each side of the recess, one in advance of the other, acting to fold the flaps toward the body of the wrapper-blank, one in advance of the other, while the rotary part is rotating and the wrapper-blank advancing in its feed, substantially as described.

3. In a bottle-wrapper machine, the combination of a rotary creasing device for providing the neck end of a wrapper-blank with diagonal scores, a rotary bending device for partially bending over the flaps along the lines of the scores, a rotary folding device having a recess into which the partially-bent overflaps may take, and a shoulder at each side of the recess, one in advance of the other, acting to fold the flaps toward the body of the wrapper-blank, one in advance of the other, substantially as described.

4. In a bottle-wrapper machine, the combination of a severing device for cutting off the wrapper-blank, a rotary creasing device for providing the wrapper-blank with diagonal scores for indicating the flaps, a pasting device, with a rotary bending device for partially bending over the flaps along the diagonal scores made by the creasing device, and a rotary folding device having engaging faces for taking against the partially-bent flaps and folding the same, one in advance of the other, toward the body of the wrapper-blank along the diagonal lines of the scores, while the folding device is rotating and the wrapper-blank is advancing in its feed, substantially as described.

5. In a bottle-wrapper machine, the combination of a severing device for cutting off the wrapper-blank, a rotary creasing device for providing the wrapper-blank with diagonal scores for indicating the flaps, with means for adjusting the distance between the severing device and the rotary creasing device, a pasting device, with a rotary bending device for partially bending over the flaps along the diagonal scores made by the creasing device and a rotary folding device having engaging faces for taking against the partially-bent flaps and folding the same, one in advance of the other, toward the body of the wrapper-blank along the diagonal lines of the scores, while the folding device is rotating and the wrapper-blank is advancing in its feed, substantially as described.

6. In a bottle-wrapper machine, the combination of a rotary creasing device having a plurality of sets of diagonal faces for creasing-blades for scoring wrapper-blanks along diagonal lines, a rotary bending device having a plurality of sets of diagonal faces for bending-blades with a plurality of sets of corresponding diagonal opposing shoulders between which and the blades the wrapper-blanks are adapted to take for partially bending the flaps at the neck end of the wrapper-blanks along diagonal lines, and a rotary folding device constructed and arranged for folding the partially-bent flaps along the diagonal scores made by the creasing device toward the body of the wrapper-blank by means of shoulders acting against the flaps while the folding device is rotating and the wrapper-blank being fed, substantially as described.

7. In a bottle-wrapper machine, the combination of a rotary creasing device having a plurality of sets of diagonal faces for creasing-blades for scoring wrapper-blanks along diagonal lines, a rotary bending device having a plurality of sets of diagonal faces for bending-blades with a plurality of sets of corresponding diagonal opposing shoulders between which and the blades the wrapper-blanks are adapted to take for partially bending the flaps at the neck end of the wrapper-blanks along diagonal lines, and a rotary folding device provided with shoulders for taking against the partially-bent flaps and having means for adjusting the distance between the shoulders of the rotary folding device, and constructed and arranged for folding the partially-bent flaps along the diagonal scores made by the creasing device toward the body of the wrapper-blank by means of shoulders acting against the flaps while the folding device is rotating and the wrapper-blank being fed, substantially as described.

In testimony whereof I have signed my name hereto in the presence of two subscribing witnesses.

GEORGE A. MUENZENMAIER.

Witnesses:
ERNEST G. SIMON,
HERBERT F. HARDEN.